(12) United States Patent
Ricketts

(10) Patent No.: US 10,582,662 B2
(45) Date of Patent: Mar. 10, 2020

(54) MANUAL AND SELF ADJUSTING DECK PLATE FOR AGRICULTURAL HEADER

(71) Applicant: CNH Industrial America LLC, New Holland, PA (US)

(72) Inventor: Jonathan E. Ricketts, Coal Valley, IL (US)

(73) Assignee: CNH Industial America LLC, New Holland, PA (US)

( * ) Notice: Subject to any disclaimer, the term of this patent is extended or adjusted under 35 U.S.C. 154(b) by 84 days.

(21) Appl. No.: 15/716,857

(22) Filed: Sep. 27, 2017

(65) Prior Publication Data
US 2019/0090425 A1 Mar. 28, 2019

(51) Int. Cl.
*A01D 45/02* (2006.01)
*A01D 61/00* (2006.01)
*A01D 41/14* (2006.01)

(52) U.S. Cl.
CPC ............ *A01D 45/021* (2013.01); *A01D 41/14* (2013.01); *A01D 61/004* (2013.01)

(58) Field of Classification Search
CPC .... A01D 45/021; A01D 61/004; A01D 41/14; A01D 45/025; A01D 45/023
See application file for complete search history.

(56) References Cited

U.S. PATENT DOCUMENTS

| | | | | |
|---|---|---|---|---|
| 906,868 A * | 12/1908 | Gasser | ................. | A01D 45/021 56/119 |
| 1,717,305 A | 6/1929 | Beckman | | |
| 3,101,579 A * | 8/1963 | Karlsson | ............... | A01D 45/021 56/105 |
| 3,126,690 A * | 3/1964 | Keller et al. | ......... | A01D 45/025 56/107 |
| 3,589,110 A * | 6/1971 | Schreiner | ............. | A01D 41/142 56/106 |
| 3,707,833 A * | 1/1973 | Sutton | .................. | A01D 45/025 460/135 |
| 3,759,021 A * | 9/1973 | Schreiner | ............. | A01D 45/021 56/106 |

(Continued)

FOREIGN PATENT DOCUMENTS

| EP | 1 133 911 A1 | 9/2001 |
|---|---|---|
| EP | 2412228 A1 | 2/2012 |
| EP | 2801249 A2 | 11/2014 |

OTHER PUBLICATIONS

Extended European Search Report for EP Application 18194925.6 dated Feb. 22, 2019 (five pages).

*Primary Examiner* — Arpad Fabian-Kovacs
(74) *Attorney, Agent, or Firm* — Peter K. Zacharias; Patrick M. Sheldrake

(57) ABSTRACT

A header for an agricultural vehicle includes: a header frame; a first deck plate carried by the header frame; a second deck plate carried by the header frame, the first deck plate and the second deck plate forming a gap therebetween defining a gap width and a width direction; a rotatable tube carried by the header frame and connected to at least one of the first deck plate and the second deck plate such that rotation of the rotatable tube adjusts the gap width; and a spring fixed to the rotatable tube and having at least one end captured by the second deck plate such that a force directed in the width direction acting on the second deck plate produces a spring force in the spring.

18 Claims, 4 Drawing Sheets

(56) References Cited

U.S. PATENT DOCUMENTS

| | | | |
|---|---|---|---|
| 4,621,968 A | 11/1986 | Hutchison | |
| 5,060,464 A | 10/1991 | Caron | |
| 5,181,373 A * | 1/1993 | Littau | A01D 46/28 |
| | | | 56/329 |
| 5,680,750 A * | 10/1997 | Stefl | A01D 45/021 |
| | | | 56/119 |
| 6,226,969 B1 | 5/2001 | Becker | |
| 6,237,312 B1 * | 5/2001 | Becker | A01D 45/021 |
| | | | 56/119 |
| 6,625,969 B2 | 9/2003 | Glazik | |
| 7,073,316 B2 | 7/2006 | Resing et al. | |
| 8,220,235 B2 | 7/2012 | Kowalchuk | |
| 8,224,534 B2 | 7/2012 | Kowalchuk | |
| 8,267,240 B2 | 9/2012 | Moreland et al. | |
| 8,820,039 B2 | 9/2014 | Werning | |
| 9,179,602 B2 | 11/2015 | Vandeven et al. | |
| 9,232,693 B2 | 1/2016 | Hendrickson et al. | |
| 9,408,348 B2 | 8/2016 | Walker et al. | |
| 9,867,335 B1 * | 1/2018 | Obbink | A01D 45/021 |
| 2001/0039761 A1 * | 11/2001 | Savard | E05D 13/1261 |
| | | | 49/199 |
| 2008/0092507 A1 * | 4/2008 | Bollig | A01D 45/021 |
| | | | 56/106 |
| 2011/0146218 A1 * | 6/2011 | Carboni | A01D 45/021 |
| | | | 56/62 |
| 2011/0173942 A1 * | 7/2011 | Kowalchuk | A01D 45/021 |
| | | | 56/62 |
| 2012/0029757 A1 * | 2/2012 | Kowalchuk | A01D 45/021 |
| | | | 701/34.2 |
| 2014/0053524 A1 * | 2/2014 | Werning | A01D 41/1273 |
| | | | 56/62 |
| 2014/0150394 A1 * | 6/2014 | Calmer | A01D 45/021 |
| | | | 56/106 |
| 2014/0331633 A1 * | 11/2014 | Vandeven | A01D 45/021 |
| | | | 56/62 |
| 2015/0208580 A1 * | 7/2015 | Walker | A01D 45/028 |
| | | | 56/119 |
| 2015/0319929 A1 * | 11/2015 | Hendrickson | A01D 45/025 |
| | | | 33/504 |
| 2016/0113199 A1 * | 4/2016 | Jongmans | A01D 45/021 |
| | | | 56/10.2 R |
| 2016/0174461 A1 * | 6/2016 | Walker | A01D 45/021 |
| | | | 56/119 |
| 2016/0174462 A1 * | 6/2016 | Walker | A01D 45/021 |
| | | | 56/119 |
| 2016/0174463 A1 | 6/2016 | Barry | |
| 2017/0238467 A1 * | 8/2017 | Gessel | A01D 45/023 |

* cited by examiner

MANUAL AND SELF ADJUSTING DECK PLATE FOR AGRICULTURAL HEADER

FIELD OF THE INVENTION

The present invention pertains to an agricultural vehicle and, more specifically, to a header for an agricultural vehicle including deck plates.

BACKGROUND OF THE INVENTION

The header of an agricultural harvester or combine is provided with row dividers and associated hoods for directing rows of corn stalks to downstream separation devices known as row units. The row units include stalk receiving slots and stripping plates, snapping rolls, and opposed rearwardly moving gathering chains. Thus, e.g., following separation of ears from stalks by the snapping rolls and stripping plates (also known as stalk rolls and deck plates, respectively), the separated ears are delivered by the gathering chains to an auger which conveys the harvested ears to a feederhouse of the combine. Harvested ears are then processed to the combine's inner chambers for downstream processing.

Row unit frames are typically constructed with forwardly projecting members that support several components of the row unit including the deck plates, the stalk roll support bearings, the front gathering chain idlers, the hoods and the row dividers. The deck plates are flat or planar with their shape being dictated by the geometry of the row unit frames. As is known, the stalk rolls are disposed beneath the deck plates and are cooperatively rotated to pull the corn stalks downwardly into the stalk receiving slots where the ears come into contact with the deck plates and are snapped off of the stalks by the deck plates. The deck plates lie generally tangent to the upper surfaces of the stalk rolls and the stalk rolls engage the corn stalks at "pinch points" situated below the upper surfaces of deck plates.

The deck plates are generally provided in pairs defining a gap therebetween, allowing the corn stalks to enter the gap before being pulled down to the deck plates so the corn ear snaps off the stalk. Traditionally, deck plates had a fixed gap therebetween which was set by an operator. If the gap is too small for the stalk(s) encountered by the header, generally the stalk is severed rather than the corn ear snapping off the stalk, admitting a high percentage of stalks into the combine. If the gap is too large for the stalk(s) encountered by the header, large losses of shelled corn can result. Recent advances have provided adjustable deck plates that allow adjustment of the gap during operation of the header. However, the issues of excessive stalk admission into the combine and loss still remain, especially in fields where the stalk diameters vary greatly.

What is needed in the art is a header which can address some of the previously described shortcomings of known headers.

SUMMARY OF THE INVENTION

In one exemplary embodiment formed in accordance with the present invention, there is provided a rotatable tube which can adjust a gap width between two deck plates and a spring fixed to the rotatable tube which has one or both ends captured by a deck plate such that a force acting on the capturing deck plate in a width direction produces a spring force in the spring.

In another exemplary embodiment formed in accordance with the present invention, there is provided a header for an agricultural vehicle including: a header frame; a first deck plate carried by the header frame; a second deck plate carried by the header frame, the first deck plate and the second deck plate forming a gap therebetween defining a gap width and a width direction; a rotatable tube carried by the header frame and connected to at least one of the first deck plate and the second deck plate such that rotation of the rotatable tube adjusts the gap width; and a spring fixed to the rotatable tube and having at least one end captured by the second deck plate such that a force directed in the width direction acting on the second deck plate produces a spring force in the spring.

In yet another exemplary embodiment formed in accordance with the present invention, there is provided an agricultural vehicle including a chassis and a header carried by the chassis. The header includes: a header frame; a first deck plate carried by the header frame; a second deck plate carried by the header frame, the first deck plate and the second deck plate forming a gap therebetween defining a gap width and a width direction; a rotatable tube carried by the header frame and connected to at least one of the first deck plate and the second deck plate such that rotation of the rotatable tube adjusts the gap width; and a spring fixed to the rotatable tube and having at least one end captured by the second deck plate such that a force directed in the width direction acting on the second deck plate produces a spring force in the spring.

In yet another exemplary embodiment provided in accordance with the present invention, there is provided a method of adjusting a first deck plate and a second deck plate of a header of an agricultural vehicle, the first deck plate and the second deck plate being carried by a header frame and forming a gap therebetween defining a gap width and a width direction, the method including: rotating a rotatable tube connected to at least one of the first deck plate and the second deck plate to adjust the gap width; and capturing at least one end of a spring by the second deck plate such that a force directed in the width direction acting on the second deck plate produces a spring force in the spring, the spring being fixed to the rotatable tube.

One possible advantage of exemplary embodiments formed in accordance with the present invention is the rotatable tube can rotate to provide rough, manual adjustment of the gap width, with the spring then providing fine tuning and self-adjusting during operation.

Another possible advantage of exemplary embodiments formed in accordance with the present invention is the rotatable tube and spring can allow for control and self-adjustment of the gap width with a relatively simple construction.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Figure 1:
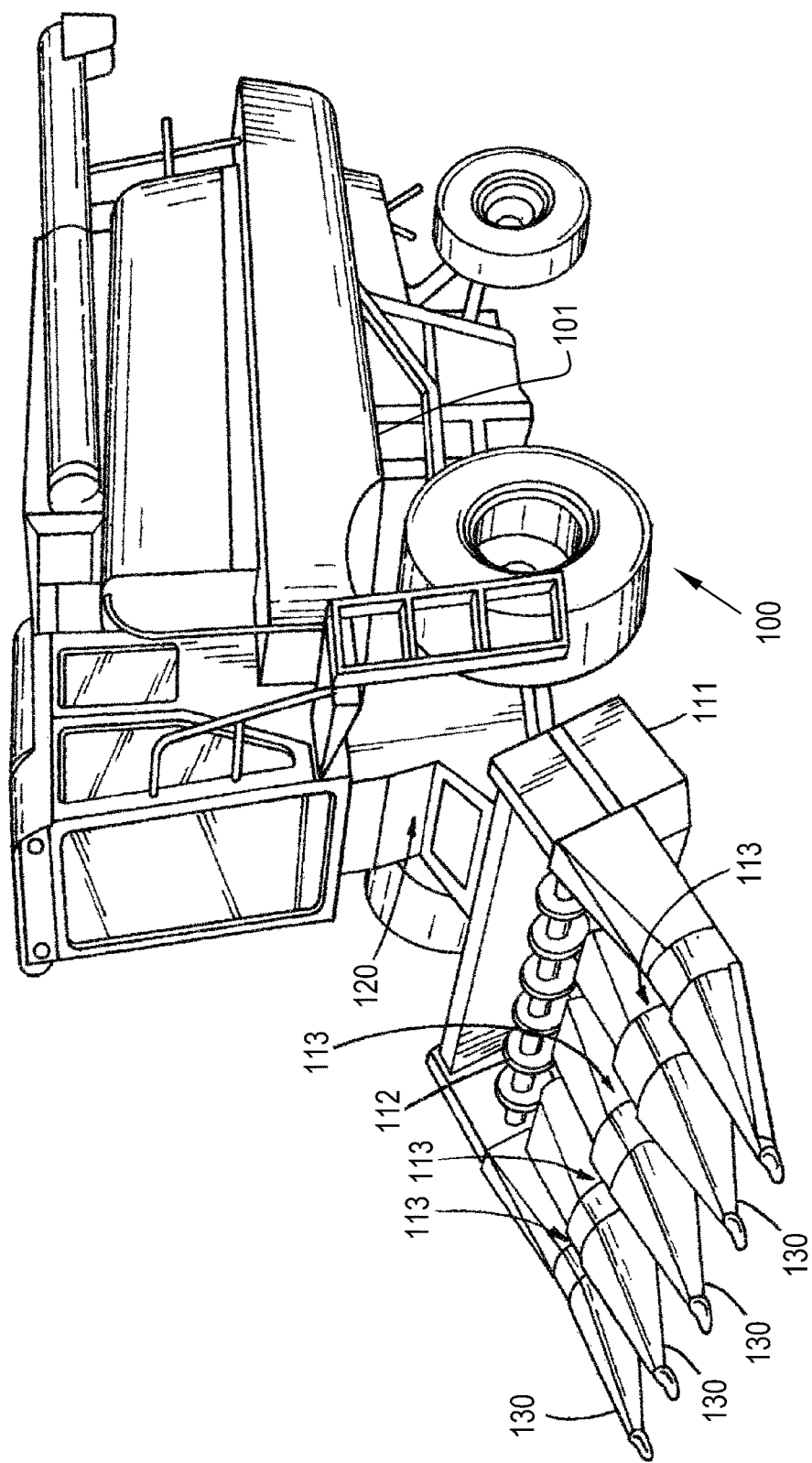
FIG. 1 illustrates a perspective view of an exemplary embodiment of an agricultural vehicle, the agricultural vehicle comprising a chassis and a header, in accordance with an exemplary embodiment of the present invention.

Referring now to the drawings, FIG. 1 illustrates an exemplary embodiment of an agricultural harvester such as a combine 100 including a chassis 101 carrying a header 110, shown as a corn header, in accordance with the present invention. The header 110 is shown to be operatively carried by the chassis 101 for harvesting e.g., cutting corn and feeding the corn to a feederhouse for receiving crop residue, cutting, chopping and propelling the residue rearwardly and outwardly from the agricultural harvester 100 while retaining the valuable corn ears and kernels. Such feederhouses and harvesting operations are known in the art and a further detailed description of their structure, function and operation is not necessary for a complete understanding of the present invention. Alternatively, the header 110 can be connected to any device that may have use for a corn header.

Figure 2:
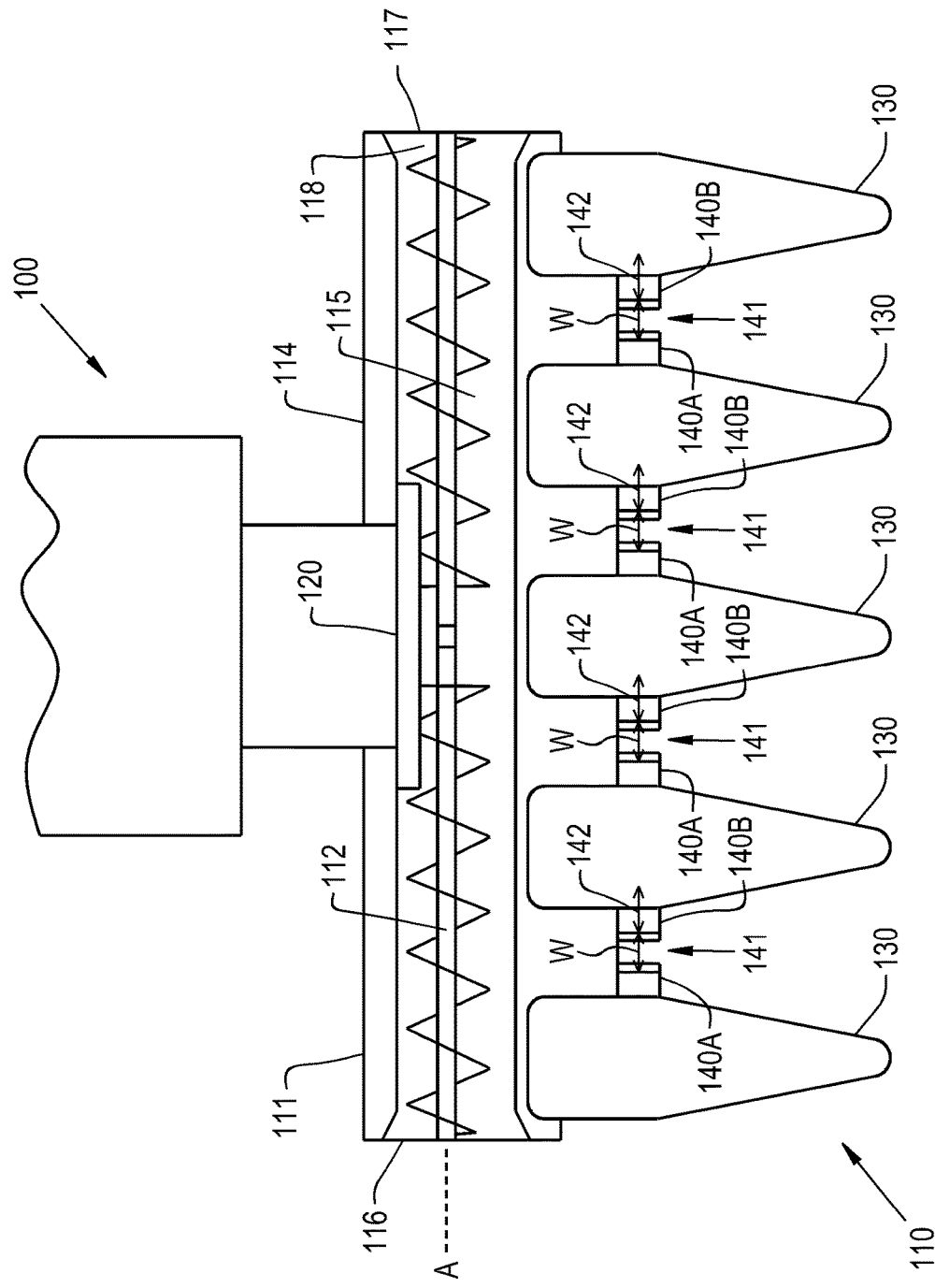
FIG. 2 illustrates a top view of the header of the agricultural vehicle of FIG. 1, in accordance with an exemplary embodiment of the present invention.

Referring to FIGS. 1 and 2, the header 110 includes a header frame 111 for mounting to a forward end of the agricultural harvester 100, a conveyor 112 (such as an auger) extending lengthwise across the header frame 111 for conveying crop material to a combine feeding location or feederhouse 120, and a plurality of row units 113 extending forwardly from the header frame 111. In the shown exemplary embodiment, the header frame 111 can be configured as a substantially rectangular frame; in other exemplary embodiments, the header frame 111 can be configured in different shapes. As seen in FIG. 2, the header frame 111 includes a rear wall 114, a bottom wall 115 and a pair of side walls 116, 117. The header frame 111 further includes a channel 118 formed partially by the bottom wall 115. The conveyor 112 conveys harvested corn along the channel 118 to the combine feeding location 120 located adjacent a midpoint of the channel 118.

The conveyor 112 can be a screw auger conveyor, but can alternatively be any conveyor capable of moving grain through the channel 118, such as a paddle system, a conveyor belt, a pressure based system, or any combination thereof. Such conveyors are known in the art and a further detailed description of their structure, function and operation is not necessary for a complete understanding of the present invention. However, typical augers applicable to the present invention are disclosed in U.S. Pat. Nos. 8,267,240 and 4,621,968, the entire disclosures of which are incorporated by reference herein.

The auger 112 can be connected to the header frame 111 at the side walls 116, 117 and rotates about axis A. The half of the auger 112 that is closest to side wall 116 moves the harvested crop towards the opposite side wall 117 and the half of the auger 112 that is closest to side wall 117 moves the harvested crop towards the opposite side wall 116. The auger 112 is positioned in front or above the combine feeding location 120 and, as the auger 112 rotates, harvested grain moves towards the center of the auger 112 for feeding the harvested grain into the combine feeding location 120.

Referring still to FIGS. 1 and 2, the header 100 can further include a plurality of row dividers 130. The row dividers 130 extend forwardly from the header frame 111 and are connected to extend across a pair of adjacent row units 113 (FIG. 1). Such dividers 130 are known in the art and a further detailed description of their structure, function and operation is not necessary for a complete understanding of the present invention. However, exemplary dividers applicable to the present invention are disclosed in U.S. Pat. Nos. 6,625,969 and 7,073,316, the entire disclosures of which are incorporated by reference herein. The dividers 130 extend forwardly from the header frame 111 and are connected to the plurality of row units 113 for directing a row of corn stalks towards deck plates 140A, 140B (also commonly known as a stripping plates) of the row units 113 (FIG. 2). That is, during harvesting operations, the row dividers 130 direct a row of corn stalk towards deck plates 140A, 140B and stalk stripping rolls (not shown) situated between adjacent dividers 130. The deck plates 140A, 140B form a gap 141 therebetween for receiving corn stalks and, as is known, the stalk stripping rolls pull the stalk downwardly snapping the corn ear when it strikes the deck plates 140A, 140B. The stalk stripping rolls can pull most of the crop residue down and out of the header 110.

Referring specifically now to FIG. 2, it can be seen that the deck plates 140A, 140B of the row units 113 can be paired together so the deck plates 140A, 140B include a first deck plate 140A and a second deck plate 140B, the deck plates 140A, 140B forming the gap 141 therebetween. The gap 141, as can be seen, defines a gap width W between the deck plates 140A, 140B and a width direction, indicated by arrow 142, with movement of the deck plates 140A, 140B in the width direction 142 changing the gap width W defined between the deck plates 140A, 140B. As should be appreciated, the gap width W defined between the deck plates 140A, 140B determines the width of stalks that may be admitted into the gap 141 instead of being severed by the deck plates 140A, 140B during harvesting.

Figure 3:
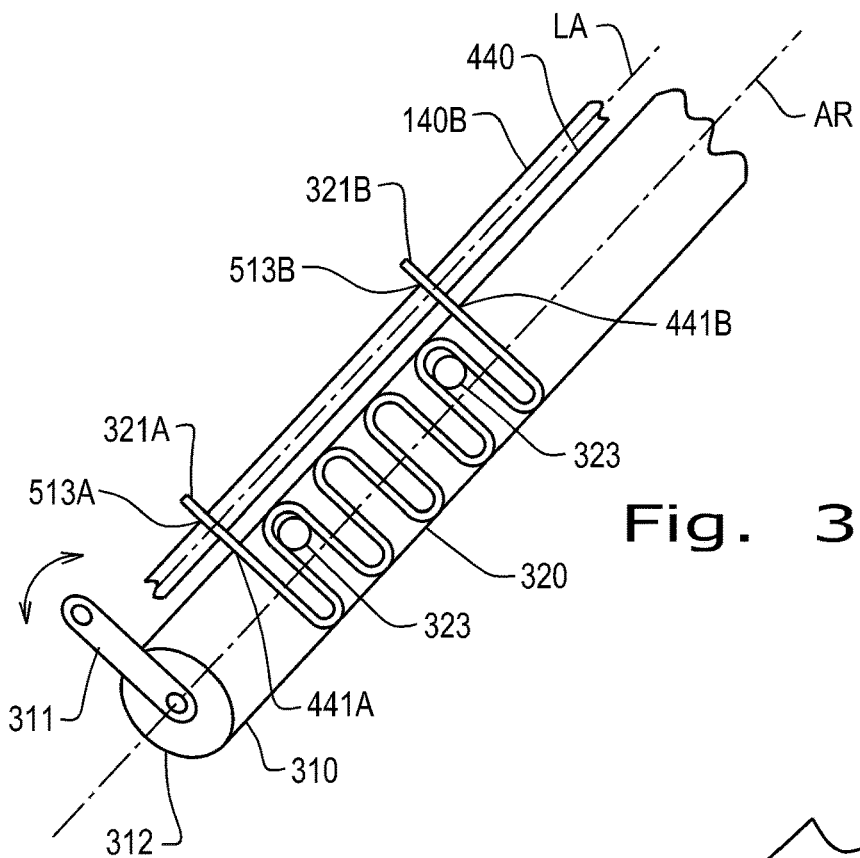
FIG. 3 illustrates a deck plate, rotatable tube, and spring of the header of FIGS. 1-2, in accordance with an exemplary embodiment of the present invention.

Referring now to FIG. 3, the second deck plate 140B is shown connected to a rotatable tube 310 such that rotation of the rotatable tube 310 adjusts the gap width W. While the exemplary embodiment shown has a second deck plate 140B connected to the rotatable tube 310, it should be appreciated that the rotatable tube 310 can, in other exemplary embodiments, connect to the first deck plate 140A or both the second deck plate 140B and the first deck plate 140A. Rotation of the tube 310 can directly cause the adjustment of the gap width W by, in one exemplary embodiment, carrying the second deck plate 140B in the width direction 142 during rotation or, in other exemplary embodiments, interacting with a mechanism (not shown) which converts rotational motion of the tube 310 into linear motion of the deck plate 140B in the width direction 142; many mechanisms for converting rotational motion into linear motion are known, and therefore further description of such mechanisms are omitted for brevity. In some exemplary embodiments, the tube 310 can include a lever 311 attached at a longitudinal end 312 so a user can manually rotate the tube 310 to obtain the desired gap width W between the deck plates 140A, 140B. After the user adjusts the gap width W to the desired amount, rotation of the tube 310 can be locked so rough adjustment of the gap width W is essentially locked. In some exemplary embodiments, the rotatable tube 310 can define an axis of rotation AR which is substantially parallel with a longitudinal axis LA of the second deck plate 140B, with the rotatable tube 310 being located below the deck plate 140B.

Figure 4:
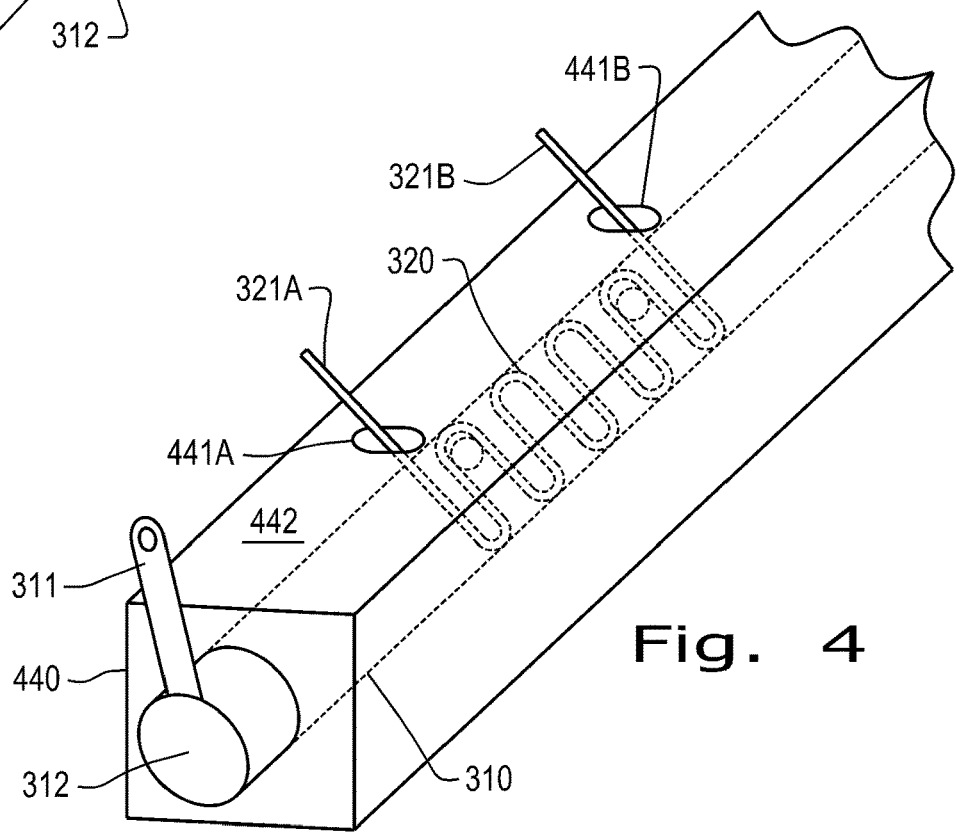
FIG. 4 illustrates the rotatable tube and spring shown in FIG. 3, in accordance with an exemplary embodiment of the present invention.
Figure 5:
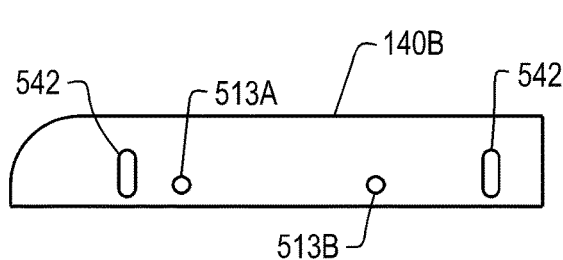
FIG. 5 illustrates the deck plate shown in FIG. 3, in accordance with an exemplary embodiment of the present invention.
Figure 6:
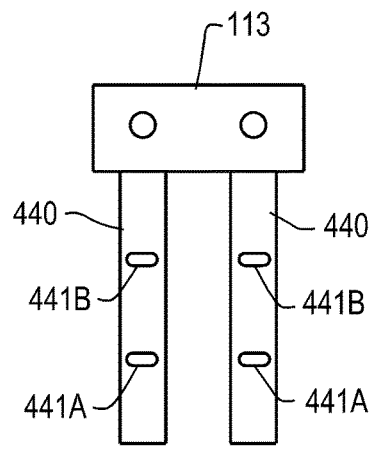
FIG. 6 illustrates a stalk roll frame of the header shown in FIGS. 1-2, in accordance with an exemplary embodiment of the present invention.

With further reference to FIG. 3, and referring now also to FIGS. 4-6, the rotatable tube 310 has a spring 320 fixed thereto which has one or both ends 321A, 321B captured by the second deck plate 140B such that movement of the deck plate 140B in the width direction 142 produces a spring force in the spring 320. In some exemplary embodiments, the spring 320 is a coil spring which surrounds the rotatable tube 310 and has both ends 321A, 321B captured in respective spring holes 513A, 513B formed through a top and bottom surface of the second deck plate 140B. As used herein, the ends 321A, 321B of the spring 320 are "captured" by the second deck plate 140B in the sense that movement of the second deck plate 140B in the width direction 142 can produce a spring force acting on the spring 320 which tends to deform the spring 320 due to the spring 320 being fixed to the rotatable tube 310; the specific deformation of the spring 320 will depend on the configuration of the spring 320 and the associated spring constant. In some exemplary embodiments, the spring 320 can be formed as a relatively rigid, high tensile coil spring from, for example, steel which is rigid enough to abut against and move the second deck plate 140B as the tube 310 rotates. In some exemplary embodiments, the spring 320 can have portions that extend through respective elongated openings 441A, 441B formed in a top surface 442 of a stalk roll frame 440 which may partially or completely enclose the rotatable tube 310. It should be appreciated that the stalk roll frame 440 enclosing the rotatable tube 310 is not a requirement; in some exemplary embodiments, the rotatable tube 310 can be unenclosed. As can be seen in FIG. 6, when a rotatable tube 310 and associated spring 320 connects to each deck plate 140A, 140B (not shown in FIG. 6), portions of the springs 320 can extend through top surfaces 442 of respectively associated stalk roll frames 440. Further, one or both deck plates 140A, 140B can have one or more retainer slots 542 formed therein to control the maximum movement of the deck plate(s) 140A, 140B in the width direction 142, as is known.

In one exemplary embodiment formed in accordance with the present invention, the spring 320 is rotationally fixed to the rotatable tube 310 by, for example, one or more spring retainers 323, shown as pins, which are placed between coils of the spring 320 and holds the spring 320 to the rotatable tube 310 as the tube 310 rotates, i.e., the spring retainer(s) 323 keep the spring 320 rotationally static relative to the tube 310. By having the spring 320 rotationally fixed to the tube 310, adjustment of the gap width W by rotating the tube 310 can be performed when the spring 320 is disconnected from the deck plate 140B, so spring force is not produced in the spring 320 during the adjustment. After rotation of the tube 310 is finished, one or both ends 321A, 321B of the spring 320 can be captured by the deck plate 140B so a force directed in the width direction 142 acting of the deck plate 140B produces a spring force in the spring 320. In other words, the spring 320 can be reversibly connected to the deck plate 140B by the deck plate 140B capturing one or both ends 321A, 321B of the spring 320. Optionally, the spring 320 can be pre-loaded with a tensile or compressive force prior to the deck plate 140B capturing the end(s) 321A, 321B of the spring 320, so the deck plate(s) 140A, 140B are pre-tensioned. The force acting in the width direction 142 may be caused, for example, by the deck plates 140A, 140B abutting against a corn stalk with a stalk width which is greater than the gap width W. Due to the deck plate 140B capturing end(s) 321A, 321B of the spring 320, the deck plate 140B can be allowed to move in the width direction 142 responsively to the force in the width direction 142 caused by abutment by the corn stalk and forward movement of the agricultural vehicle 100, producing a spring force and associated deformation in the spring 320 so the deck plates 140A, 140B may spread further apart and allow the corn stalk to enter the gap 141, rather than being cut by the deck plates 140A, 140B, before being pulled down toward the deck plates 140A, 140B to snap off the corn ear. In this sense, the spring 320 allows the deck plates 140A, 140B to spread apart during operation, rather than being rigidly fixed relative to one another after the gap width W is set by the rotatable tube 310. Upon the corn stalk leaving the gap 141, and therefore the associated force being removed, the spring 320 can rebound to its normal, resting state and return the deck plates 140A, 140B to the preset gap width W. Therefore, exemplary embodiments formed in accordance with the present invention provide a spring 320 which can allow the deck plates 140A, 140B to self-adjust to varying stalk widths during operation and also allow fine-tuning of the gap 141 by adjusting the pre-loaded tension, or compression, of the spring 320.

Figure 7:
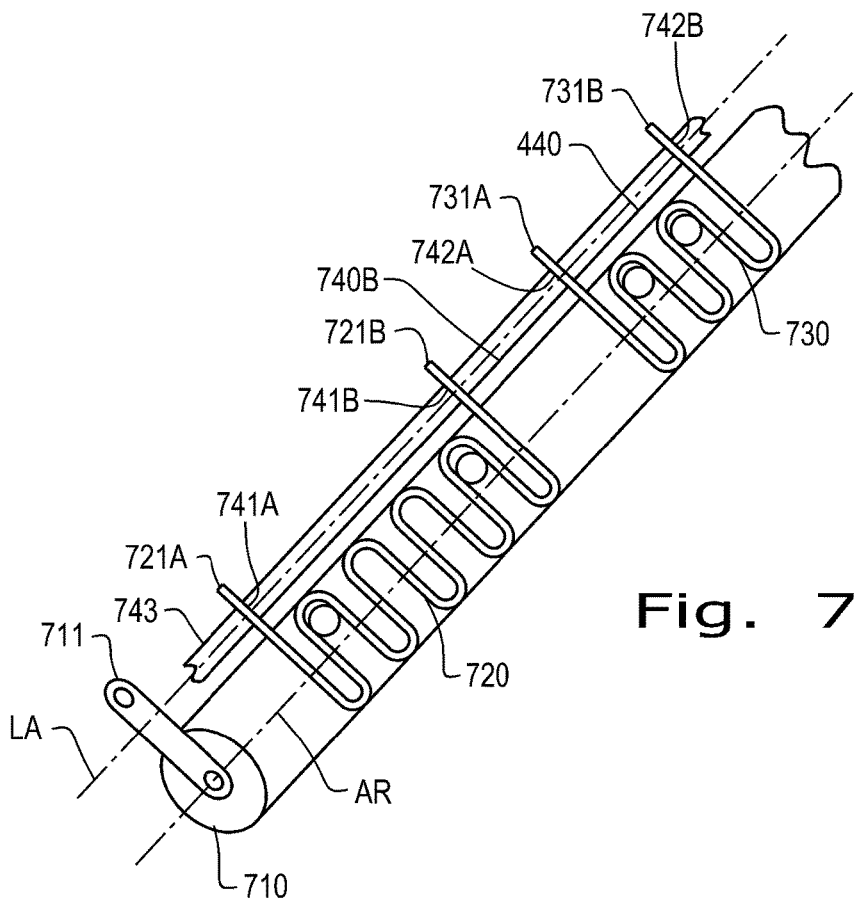
FIG. 7 illustrates a deck plate, rotatable tube, and pair of springs which can be incorporated in the header of FIGS. 1-2, in accordance with another exemplary embodiment of the present invention.

In another exemplary embodiment, and referring now to FIG. 7, a deck plate 740B, which may be used in place of deck plate 140B, can be adjusted by a rotatable tube 710 similarly to the previously described deck plate 140B and associated rotatable tube 310. Similar to the previously described rotatable tube 310, the rotatable tube 710 have a lever 711 for manual adjustment of the gap width W and define an axis of rotation AR which is parallel to a longitudinal axis LA of the deck plate 740B. A spring 720 can be rotationally fixed to the tube 710, similar to previously described spring 320, and have one or both ends 721A, 721B captured by the deck plate 740B such that a force directed in the width direction 142 acting on the deck plate 740B produces a spring force in the spring 720. In addition, a second spring 730 can be fixed, such as rotationally fixed, to the rotatable tube 710 and also have one or both ends 731A, 731B captured by the deck plate 740B such that a force directed in the width direction 142 acting on the deck plate 740B produces a spring force in the second spring 730. To capture the respective end(s) 721A, 721B, 731A, 731B of the springs 720, 730, the deck plate 740B can have one or more first spring holes 741A, 741B which can capture the end(s) 721A, 721B of the spring 720 as well as one or more second spring holes 742A, 742B which can capture the end(s) 731A, 731B of the spring 730. In one exemplary embodiment, the springs 720, 730 can both be coil springs which surround the rotatable tube 710, but have different spring constants; in one exemplary embodiment, the spring 720 defines a first spring constant and the second spring 730 defines a second spring constant which is greater than the first spring constant, so more force is required to deform the second spring 730 a same deformation distance as the spring 720. Further, the deck plate 740B can define a front 743 which will tend to contact stalks first during operation, and a rear 744 which will behind the front 743 during operation. The end(s) 721A, 721B of the spring 720 can be captured closer to the front 743 of the deck plate 740B than the end(s) 731A, 731B of the second spring 730, as shown, so it requires less force to move the deck plate 740B in the width direction 142 adjacent to the front 743 of the deck plate 740B compared to the rear 744 of the deck plate 740B. It should therefore be appreciated that the self-adjusting behavior of the deck plate 740B can be controlled by adjusting the relative spring constants of the spring 720 and the second spring 730. It should be appreciated that while two springs 720, 730 are shown and described, more than two springs can also be utilized, if desired.

Although the springs 320 and 720 are shown as coil springs in the illustrated embodiments, it will be appreciated that other types of springs can also be used in some other embodiments, such as a spring steel strip, etc.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A header for an agricultural vehicle, comprising:
   a header frame;
   a first deck plate carried by said header frame;
   a second deck plate carried by said header frame, said first deck plate and said second deck plate forming a gap therebetween defining a gap width and a width direction;
   a rotatable tube carried by said header frame and connected to at least one of said first deck plate and said second deck plate such that rotation of said rotatable tube adjusts said gap width; and
   a spring rotationally fixed to said rotatable tube and having at least one end captured by said second deck plate such that a force directed in the width direction acting on said second deck plate produces a spring force in said spring.

2. The header of claim 1, wherein said spring is rotationally fixed to said rotatable tube by a pin.

3. The header of claim 1, wherein said spring is a coil spring.

4. The header of claim 1, wherein said second deck plate captures opposing ends of said spring.

5. The header of claim 1, further comprising a second spring with at least one end captured by said second deck plate such that a force directed in the width direction acting on said second deck plate produces a spring force in said second spring.

6. The header of claim 5, wherein said spring defines a first spring constant and said second spring defines a second spring constant which is greater than said first spring constant.

7. The header of claim 6, wherein said second deck plate defines a front and a rear, said spring being captured by said second deck plate closer to said front than said second spring.

8. The header of claim 1, wherein said spring surrounds said rotatable tube.

9. An agricultural vehicle, comprising:
   a chassis;
   a header carried by said chassis and including:
      a header frame;
      a first deck plate carried by said header frame;
      a second deck plate carried by said header frame, said first deck plate and said second deck plate forming a gap therebetween defining a gap width and a width direction;
      a rotatable tube carried by said header frame and connected to at least one of said first deck plate and said second deck plate such that rotation of said rotatable tube adjusts said gap width; and
      a spring rotationally fixed to said rotatable tube and having at least one end captured by said second deck plate such that a force directed in the width direction acting on said second deck plate produces a spring force in said spring.

10. The agricultural vehicle of claim 9, wherein said spring is rotationally fixed to said rotatable tube by a pin.

11. The agricultural vehicle of claim 9, wherein said spring is a coil spring.

12. The agricultural vehicle of claim 9, wherein said second deck plate captures opposing ends of said spring.

13. The agricultural vehicle of claim 9, further comprising a second spring having at least one end captured by said second deck plate such that a force directed in the width direction acting on said second deck plate produces a spring force in said second spring.

14. The agricultural vehicle of claim 13, wherein said spring defines a first spring constant and said second spring defines a second spring constant which is greater than said first spring constant.

15. The agricultural vehicle of claim 14, wherein said second deck plate defines a front and a rear, said spring connecting to said second deck plate closer to said front than said second spring.

16. The agricultural vehicle of claim 9, wherein said spring surrounds said rotatable tube.

17. A method of adjusting a first deck plate and a second deck plate of a header of an agricultural vehicle, said first deck plate and said second deck plate being carried by a header frame and forming a gap therebetween defining a gap width and a width direction, said method comprising:
   rotating a rotatable tube connected to at least one of said first deck plate and said second deck plate to adjust said gap width; and
   capturing at least one end of a spring by said second deck plate such that a force directed in the width direction acting on said second deck plate produces a spring force in said spring, said spring being rotationally fixed to said rotatable tube such that said rotating also rotates said spring.

18. The method of claim 17, wherein said capturing occurs after said rotating.

* * * * *